United States Patent Office 2,732,780
Patented Jan. 31, 1956

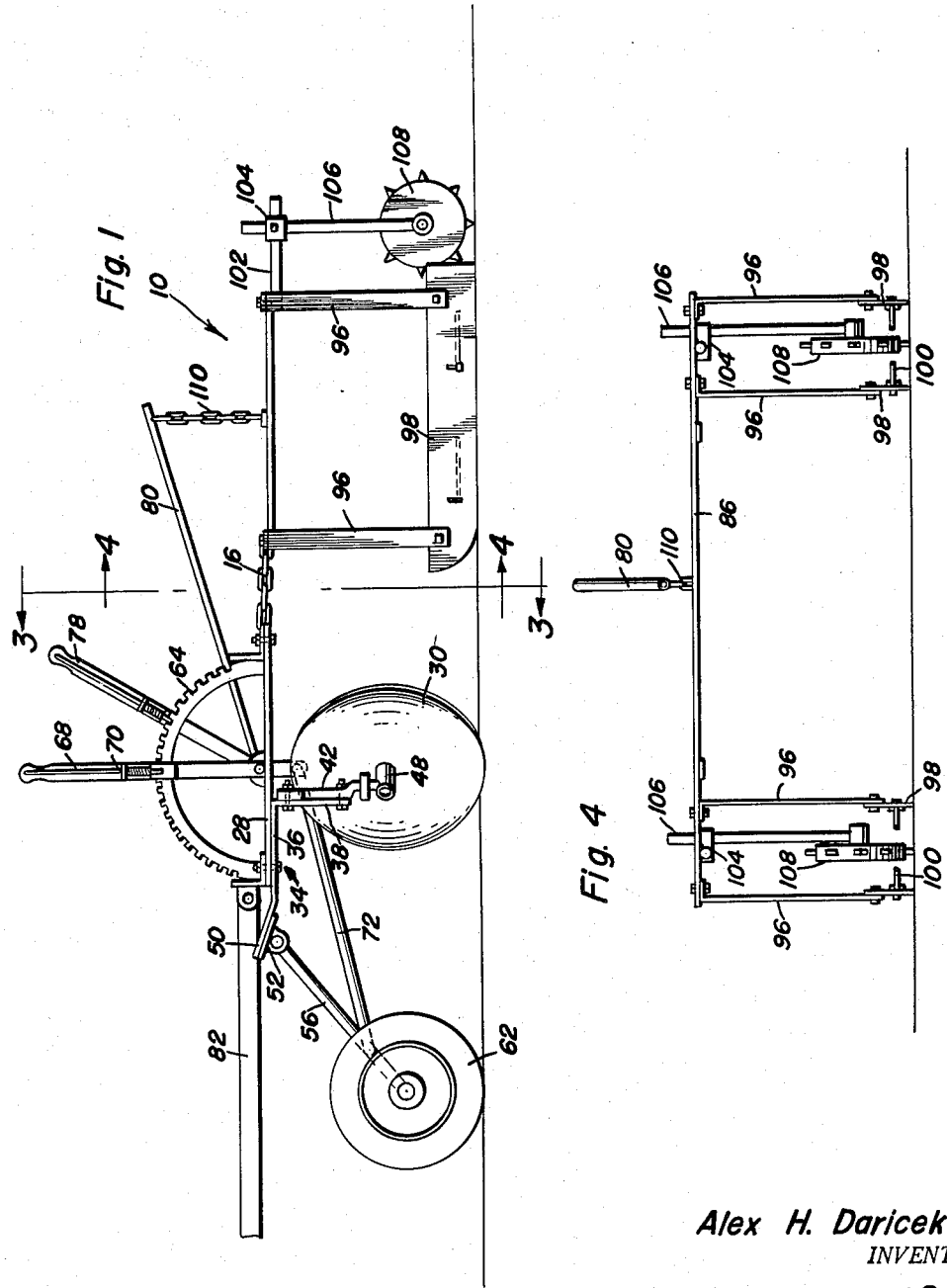

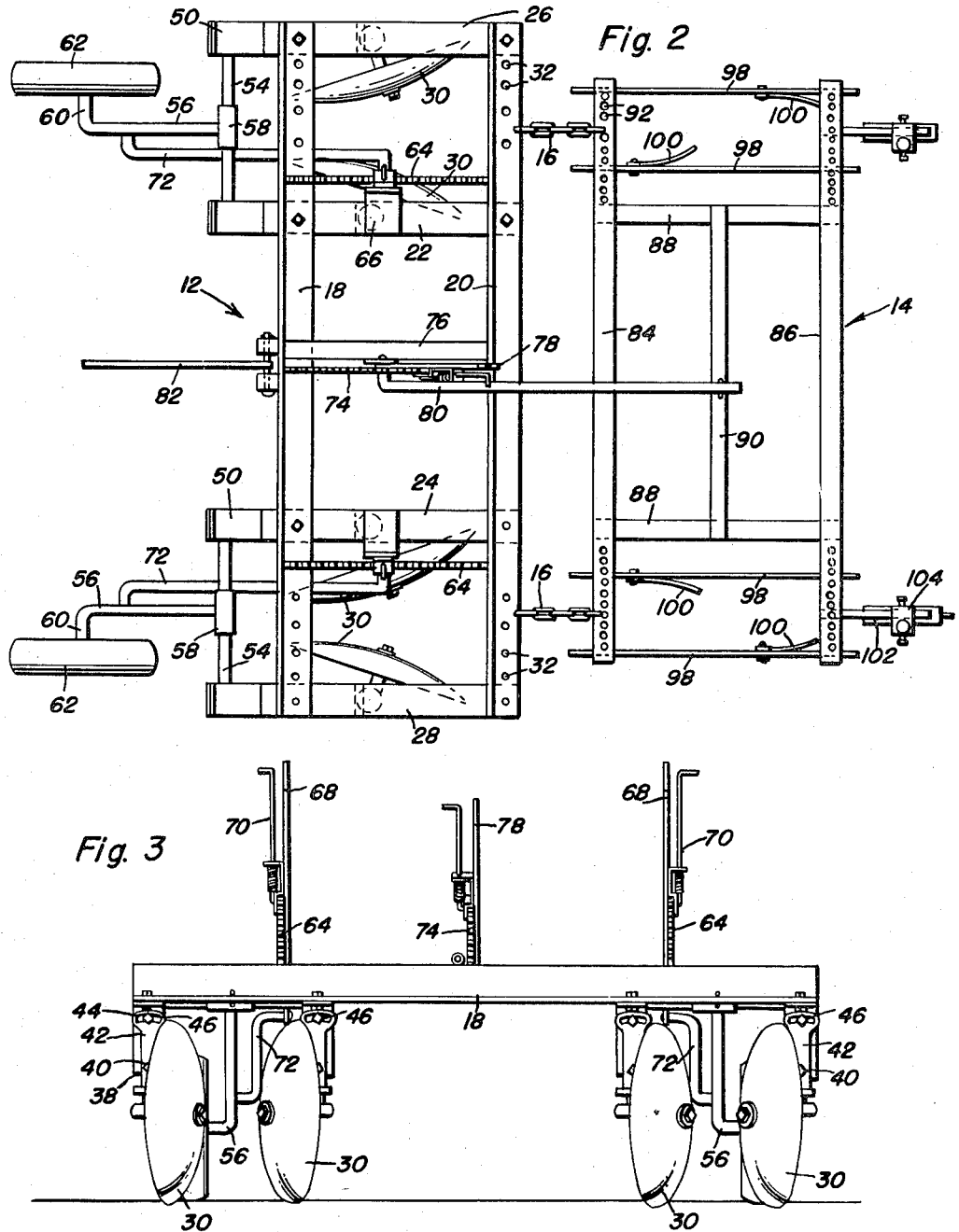

2,732,780

AGRICULTURAL IMPLEMENT

Alex H. Daricek, Maple, Tex.

Application October 27, 1952, Serial No. 317,052

5 Claims. (Cl. 97—8)

The present invention relates to agricultural implements and more particularly relates to a cultivating implement which is particularly adapted for breaking the crust formed directly over rows of sprouting seeds, while simultaneously cultivating along and between the rows.

A primary object of the invention is to provide a crust breaking device that in addition to uncovering planted crops will additionally lift the crust of the soil before breaking the same to assure the proper looseness in the soil and for the more important purpose of killing the young weeds that tend to come up as the crust is formed, particularly after hard rains.

Another object of the invention is to provide a device of the above described character consisting of two flexibly connected frames, one carrying cultivating units and the other carrying crust lifters and breakers.

Yet another object of the invention is to provide an implement of the above described character wherein the height of the cultivating implements and of the crust lifting and breaking units may be varied with respect to one another and whereby the whole assembly may be lifted about one of the frames and rollingly supported upon wheels.

These, together with various ancillary objects and features which will later become apparent as the following description proceeds, are attained by this invention, a preferred embodiment of which is shown by way of example only in the accompanying drawings, wherein:

Figure 1 is a side elevational view of the crust breaker;

Figure 2 is a top elevational view of the crust breaker;

Figure 3 is a cross-sectional view of the crust breaker taken substantially along section line 3—3 of Figure 1; and Figure 4 is another cross-sectional view similar to Figure 3 but taken in the opposite direction substantially along section line 4—4 of Figure 1.

Referring now to the accompanying drawings in detail, wherein like reference numerals are utilized to designate like characters throughout the various views, the numeral 10 represents the combination cultivating and crust breaking implement of the present invention in its entirety.

The implement consists generally of a pair of substantially rectangular frames 12 and 14 flexibly connected to one another by means of chains or other flexible members 16. The first frame 12 includes front and rear main frame members 18 and 20, intermediate cross frame members 22 and 24 spaced inwardly from the ends of the main frame members and adjustable cross frame members 26 and 28. Suspended from each of the cross frame members is a cultivating disk or disk harrow 30, the disks on the cross frame members 22 and 26 forming one gang at one side of the frame 12 and the disks 30 on the cross frame members 24 and 28 forming a second gang on the other side of the frame 12. It is to be noted that adjacent their ends, the main frame members 18 and 20 are provided with longitudinally spaced apertures 32 whereby the end cross frame members 26 and 28, respectively, may be moved toward the cross frame members 22 and 24, respectively, to vary the spacing between the disks of each gang.

Referring particularly to Figures 1 and 3, the mounting of the disks 30 on the cross frame members will be clearly observed. Mounted on the underside of each of the cross members is an L-shaped bracket 34 having a horizontal leg 36 abutting the undersurface of each cross member such as 28 indicated in Figure 1 and a vertically depending leg 38 extending below the plane of the frame. Abutting the vertical leg 38 of each L-shaped bracket and pivotally secured thereto intermediate its ends as by fastener 40 is a standard 42. The standard 42, of each disk suspension assembly, has an arcuate slot 44 formed in its upper end through which fastener 46 extends to secure the upper end of the standard 42 to the leg 38. By this arrangement, it is obvious that the angular disposition of the disks 30 with respect to one another may be adjusted with respect to one another simply by loosening the fasteners 46 and pivoting the standard 42 about its pivot point 40 to the limit of the arcuate slots 44. It is to be understood, of course, that bearing sleeves such as 48 are secured to the lower ends of the standards 42 whereby the disks 30 may be rotatably mounted on the standards.

The horizontal legs 36 of the L-shaped brackets 34 extend beyond the peripheral edge of the front main frame member 18 and extend obliquely upwardly as at 50 at their outer ends. Secured to the underside of the upwardly extending portions 50 of the horizontal legs 36 are bearings 52 and in each pair of bearings 52, the ends of a wheel supporting shaft 54 are journaled. A standard 56 is mounted upon and suspended from the intermediate portion of each of the shafts 54 by the sleeve 58. The lower ends of the standards 56 are angulated to form stub axles 60 upon which the guide wheels 62 are rotatably journaled. Bridging the main frame members 18 and 20 of the frame 12 adjacent each of the cross frame members 22 and 24, respectively, are toothed quadrants 64. Brackets 66 are also mounted intermediate the ends of each of the cross frame members 22 and 24 and have vertically disposed end portions approximately at the radial center part of each quadrant. Pivotally secured to the upstanding portions of these brackets 66 are actuating levers 68 having spring urged dog arrangements 70 thereon contacting the toothed edge of each quadrant and maintaining the levers 68 in a desired position. Rocker arms 72 are pivotally secured at their inner ends to the lower ends of the levers 68 and at their outer ends to the standards 56 whereby upon pivotal movement of the actuating lever 68, the wheels 62 are raised and lowered with respect to the frame 12. By this arrangement, it is clear that the wheels 62 may be raised and lowered to adjust the depth of ground penetration of the disks 30 or to raise the disks 30 out of ground contact altogether.

Bridging the central portion of the main frame members 18 and 20 is a third quadrant 74 and also bridging these frame members adjacent the quadrant 74 is a bracket 76 to which an actuating lever 78 is secured in substantially the same relation as are actuating levers 68 to the quadrants 64. Pivotally secured to the bracket 76 for movement with the lever 78 is an elongated bar 80 extending over the rear main frame member 20 and overlying the second frame 14. The purpose of this construction will later become apparent.

A draw bar 82 pivotally extends forwardly from the front frame member 18 whereby both of the frames 12 and 14 may be drawn by a tractor or other power means.

The second frame 14 includes a front main frame member 84, a rear main frame member 86, cross frame members 88 intermediate the ends of the main frame members 84 and 86 and a brace frame member 90 extending between the cross frame members 88. Chains 16 interconnect the rear frame member 20 of the frame 12 with the front frame member 84 of the frame 14 to provide a flexible connection between the frames. The ends of the frame members 84 and 86 are provided with longitudinally spaced apertures 92 from which depend pairs of L-shaped standards 96. Runners 98 are secured to the aligned standards 96 on the members 84 and 86. Noting particularly Figure 2, it will be seen that each pair of runners 98 is disposed in the same path of movement as are the gangs of disks 30 at each end of the frame 12. Further, by provision of the spaced apertures 92, the spacing between adjacent pairs of runners 98 may be varied in the same manner as the spacing between the disks 30 of each gang. Thus, the path of movement of the runners may be varied with respect to the gangs of disks 30. To the opposing surfaces of each pair of runners 98 are secured arcuated spring fingers 100, the purpose of which is to lift the crust of the earth as the same is loosened by the gangs of disks on the frame 12.

Secured to the undersurface of the rear frame member 86 of the frame 14 and extending horizontally rearwardly therefrom adjacent each end is a stub shaft 102. Slidably mounted on the stub shaft 102 at each end of the frame 14 is a mounting bracket 104 from which depends a vertical standard 106. At the lower end of each standard 106 is a toothed disk or wheel 108. Each wheel 108 is disposed between a pair of runners 98 so that crust lifted by the spring fingers 100 will be pulverized by the rolling of this wheel during the movement of the frames 12 and 14. It is to be understood, of course, that the standard 106 is vertically adjustable in the bracket 104 whereby the depth of penetration of the wheel or disk 108 may be varied as desired.

Referring now to the quadrant arrangement 74 and the lever 78 and rod 80 connections, the purpose of these members will now become apparent. The elongated bar 80 overlies the second frame 14 and a chain or other flexible element 110 connects the free end of this bar 80 to the brace member 90 of the frame 14. Thus, upon movement of the lever 78 around the quadrant 74, the supporting bar 80 is likewise moved and the frame 14 lifted for swinging movement about the frame 12 due to the flexible connection 16. Thus, the runners and crust breaking wheels 108 of the second frame 14 may be lifted out of ground engaging position and both of the frames 12 and 14 supported solely by the wheels 62 when it is desired to transport the apparatus from place to place. The utility of this arrangement whereby both the disk gangs and the crust turning and breaking apparatus may be lifted out of ground engagement for transportation is believed obvious and, accordingly, further discussion is believed to be unnecessary.

From the foregoing description, the construction and operation of the device will be readily understood. However, since numerous modifications and changes will readily occur to those skilled in the art after a consideration of the foregoing specification taken in conjunction with the accompanying drawings, it is not desired to limit the invention to the exact construction shown and described. But, all suitable modifications may be resorted to falling within the scope of the appended claims.

Having described the invention, what is claimed as new is:

1. A cultivator consisting of first and second cultivator frames, flexible means connecting said frames to one another in trailing relation, gangs of cultivator units spaced across said first frame, means mounting said units of each gang on said first frame for movement toward and away from one another, supporting wheels mounted on said frame, and actuating means for raising and lowering said wheels, supporting runners on said second frame in alignment with said gang units, fingers on said runners for lifting the crust separated by the cultivator units, and toothed disks mounted on said second frame behind said runners for crushing crust lifted by the fingers.

2. A cultivator consisting of first and second cultivator frames, flexible means connecting said frames to one another in trailing relation, gangs of cultivator units spaced across said first frame, means mounting said units of each gang on said first frame for movement toward and away from one another, supporting wheels mounted on said frame, and actuating means for raising and lowering said wheels, supporting runners on said second frame, fingers on said runners for lifting the crust separated by the cultivator units, and toothed disks mounted on said second frame behind said runners for crushing crust lifted by the fingers, said runners being arranged in pairs, each pair of runners being aligned with one of said gang units.

3. A cultivator consisting of first and second cultivator frames, flexible means connecting said frames to one another in trailing relation, gangs of cultivator units spaced across said first frame, means mounting said units of each gang on said first frame for movement toward and away from one another, supporting wheels mounted on said frame, and actuating means for raising and lowering said wheels, supporting runners on said second frame in alignment with said gang units, fingers on said runners for lifting the crust separated by the cultivator units, and toothed disks mounted on said second frame behind said runners for crushing crust lifted by the fingers, cooperating means on said frames for swinging said second frame about said first frame.

4. A cultivator consisting of first and second cultivator frames, flexible means connecting said frames to one another in trailing relation, gangs of cultivator units spaced across said first frame, means mounting said units of each gang on said first frame for movement toward and away from one another, supporting wheels mounted on said frame, and actuating means for raising and lowering said wheels, supporting runners on said second frame in alignment with said gang units, fingers on said runners for lifting the crust separated by the cultivator units, and toothed disks mounted on said second frame behind said runners for crushing crust lifted by the fingers, cooperating means on said frames for swinging said second frame about said first frame, said actuating means including a toothed sector plate on said first frame, a lever pivotally mounted adjacent said sector plate, the free end of said lever overlying said second frame, a flexible member interconnecting said second frame and the free end of said lever.

5. A cultivator consisting of first and second cultivator frames, flexible means connecting said frames to one another in trailing relation, gangs of cultivator units spaced across said first frame, means mounting said units of each gang on said first frame for movement toward and away from one another, supporting wheels mounted on said frame, and actuating means for raising and lowering said wheels, supporting runners on said second frame in alignment with said gang units, fingers on said runners for lifting the crust separated by the cultivator units, and toothed disks mounted on said second frame behind said runners for crushing crust lifted by the fingers, cooperating means on said frames for swinging said second frame about said first frame, said gangs each including a pair of spaced cultivator disks, and mounting means for said gangs whereby the disks of each gang may be angled with respect to each other.

References Cited in the file of this patent

UNITED STATES PATENTS

| 126,815 | Kleffel | May 14, 1872 |
| 595,122 | Farnsworth | Dec. 7, 1897 |
| 761,793 | Titus | June 7, 1904 |
| 885,258 | Kennedy | Apr. 21, 1908 |
| 928,604 | Heath | July 20, 1909 |
| 1,574,627 | Haines | Feb. 23, 1926 |
| 1,615,518 | Poston | Jan. 25, 1927 |
| 1,626,572 | Wiese | Apr. 26, 1927 |
| 1,639,307 | Neu | Aug. 16, 1927 |
| 2,053,618 | Legendre | Sept. 8, 1936 |
| 2,329,794 | Speck | Sept. 21, 1943 |

FOREIGN PATENTS

| 283,495 | Germany | Apr. 16, 1915 |